US011954988B2

(12) United States Patent
Bharati (10) Patent No.: US 11,954,988 B2
(45) Date of Patent: Apr. 9, 2024

(54) IMAGE PROCESSING SYSTEM FOR WILDLIFE DETECTION AND METHOD THEREOF (71) Applicant: Vivek Satya Bharati, Los Altos, CA (US)

(72) Inventor: Vivek Satya Bharati, Los Altos, CA (US)

( * ) Notice: Subject to any disclaimer, the term of this patent is extended or adjusted under 35 U.S.C. 154(b) by 469 days.

(21) Appl. No.: 17/466,268

(22) Filed: Sep. 3, 2021

(65) Prior Publication Data

US 2021/0397812 A1  Dec. 23, 2021

(51) Int. Cl.
| | | |
|---|---|---|
| G08B 13/196 | (2006.01) | |
| G06F 18/214 | (2023.01) | |
| G06F 18/2431 | (2023.01) | |
| G06N 3/04 | (2023.01) | |
| G06T 3/40 | (2006.01) | |
| G08B 7/06 | (2006.01) | |
| G06V 10/778 | (2022.01) | |
| G06V 10/82 | (2022.01) | |
| H04L 67/55 | (2022.01) | |
| H04W 4/14 | (2009.01) | |

(52) U.S. Cl.
CPC ..... G08B 13/19608 (2013.01); G06F 18/214 (2023.01); G06F 18/2431 (2023.01); G06N 3/04 (2013.01); G06T 3/40 (2013.01); G08B 7/06 (2013.01); G06V 10/778 (2022.01); G06V 10/82 (2022.01); H04L 67/55 (2022.05); H04W 4/14 (2013.01)

(58) Field of Classification Search
CPC ........ G06V 10/82; G06V 10/778; G06N 3/04; G06T 3/40; G06F 18/214; G06F 18/2431; G08B 7/06; G08B 13/19608; H04L 67/55; H04W 4/14
See application file for complete search history.

(56) References Cited

U.S. PATENT DOCUMENTS

| | | | |
|---|---|---|---|
| 9,871,959 B1 * | 1/2018 | Hlatky | H04N 23/62 |
| 10,887,507 B2 * | 1/2021 | Beach | G06F 9/542 |
| 2021/0176982 A1 * | 6/2021 | Kleckner | A01M 31/002 |

OTHER PUBLICATIONS

Nguyen, et al. (Animal Recognition and Identification with Deep Convolutional Neural Networks for Automated Wildlife Monitoring), pp. 40-49. (Year: 2017).*

* cited by examiner

Primary Examiner — Daniel G Mariam (57) ABSTRACT

A system and method for image processing for wildlife detection is provided which consists of object detection and object classification. An image capturing means capture one or more images. The image taken is converted to greyscale and re-sized and passed on to a Deep Neural Network (DNN). The image classification is executed by a processor via the Deep Neural Network in two steps. The second step is carried by a custom Convolutional Neural Network (CNN). The CNN classifies the detected object with certain parameters. After classifying a particular animal species in the captured image, it sends notifications, SMS, alerts to the surrounding neighbours. For a correct image classification, the feedback data is sent to the CNN for further re-training. Periodic retraining of the model with the images captured as part of the system execution adapts the system to a specific area being monitored and the wildlife in that area.

21 Claims, 6 Drawing Sheets

Figure 6

IMAGE PROCESSING SYSTEM FOR WILDLIFE DETECTION AND METHOD THEREOF

TECHNICAL FIELD

The present subject matter described herein, in general, relates to an image processing system and a method for object detection and classification. More specifically, the present subject matter discloses the system and method for image processing for detecting and classifying the specific wildlife and retrain the system for a different species of wildlife with a custom Convolutional Neural Network (CNN) model.

BACKGROUND

The subject matter discussed in the background section should not be assumed to be prior art merely because of its mention in the background section. Similarly, a problem mentioned in the background section or associated with the subject matter of the background section should not be assumed to have been previously recognized in the prior art. The subject matter in the background section merely represents different approaches, which in and of themselves may also correspond to implementations of the claimed technology.

Animal habitat is shrinking. New infrastructures sprawled across acres of landscape cut through wildlife habitats. Numerous animal human conflicts in such areas have resulted in the loss of lives on both the sides. For years, humans have tried to bring solutions to reduce these conflicts to save both humans and animals but with limited success. This has resulted in the search for even more technologies to reduce such conflicts. Various technological advancements like computing and networking, infrared cameras, optical fiber sensors, radars, etc. have been added to the smart hot zones near adjoining areas of human habitation to detect the movement of animals and warn humans in advance for a likelihood of animals' forage.

However, several studies have resulted in a different approach of identifying and tracking a certain species of animal to provide crucial details of surrounding biosphere with their absence and presence. Such species are "keystone species". By exerting a top-down regulation of other species, such "keystone species" like coyotes maintain the balance in the food web below and around them. When coyotes are absent or even just greatly reduced in a natural area, the relationships between the species below them in the web are altered, putting many small species at risk. Yet, they are much maligned and harshly persecuted in areas where their habitats are near human settlements. Other such mostly known human-animal conflict is of human-elephant conflict, esp. in Asia and Africa, resulting in crop damage and loss of lives of both, humans, and elephants.

However, a common aspect has been identified in most of the human-wildlife conflicts which is human beings or animals getting surprised by the sudden encounter of either. These conflicts can be avoided if humans who could potentially be affected can be forewarned about the presence of the wildlife in the local area so that they can take avoidance measures. The alerts must be quick, accurate and timely so that such measures can be taken. Avoiding the loss of valuable agricultural property, domesticated animals and human life takes away the motivation of humans to attempt to eliminate wildlife populations. In most areas with human habitation, mobile phone service is available, and people carry mobile phones throughout the day. So mobile phones are the best way to send alerts to the people who may be affected. The system must be fully automated so that alerts can be issued in an accurate and timely manner without any human intervention. As such, any automation needs to be trained for constant and real time detection and classification of wildlife if the automated system has to provide accurate alerts or notifications. An artificial intelligence (AI) based system is the nearest solution to such an issue.

In recent years, a number of research efforts have been reported in AI based systems that contribute to the protection of wildlife. Chen et al propose a Convolutional Neural Network (CNN) to automate identification of twenty different animal species from camera trap recordings. Figueroa et al also propose a technique to identify wild animals from camera-trap images. Norouzzadeh et al propose an automatic system based on deep convolutional neural networks (deep CNN) to identify, count, and describe the behaviour of several species of wildlife from camera-traps. Microsoft has developed a set of tools for training and running detectors and classifiers for wildlife images collected from camera-traps.

However, all this research focuses on wildlife identification from camera-traps, which is typically done offline using substantial computing resources. Often such camera-traps are left in the field and collected later for the analysis of images captured by them. As a result, they require significant computing resources as well as memory, ranging from tens of megabytes to hundreds of megabytes, precluding their use in low power, low memory edge devices that are needed for near real-time alert generation in the field. Furthermore, several such image processing models are very low on accuracy. These issues negate the concept of real-time image processing and detection and training. This approach works fine for studying animal behaviour and for other conservation objectives but is not useful in providing near real-time alerts to humans in the area where wildlife of concern has been detected and immediate avoidance measures need to be taken. A few image-processing models, however, provide higher accuracies but are extremely resource intensive. For example, memory requirement ranges from 225 MB for Alex-Net based implementation to 650 MB for NiN implementation, both trained on the CIFAR-10 dataset. Microsoft's Mega Detector model, part of the Camera-Traps repository, is also memory intensive, requiring around 250 MB. Hosting these image processing models on the cloud creates cost challenges and is also not practical in many deployment scenarios especially in areas adjoining forests, where broadband connectivity to the cloud cannot be assumed. Also, some of these image processing models take up to tens of seconds to process images. This would render impractical their use in time-critical tasks such as quickly detecting an incoming wildlife and alerting residents. One solution emerged by stripping-down the resource-intensive prior art image processing models to make them edge-ready. However, such solutions resulted in downgrading their performance.

Therefore, there was a long felt need for providing real time and highly accurate detection of the presence of specific wildlife species with low processing power and memory space image processing models.

SUMMARY

This summary is provided to introduce concepts related to an image processing system and a method for object detection and classification, and the concepts are further described below in the detailed description. This summary is not intended to identify essential features of the claimed subject matter nor is it intended for use in determining or limiting the scope of the claimed subject matter.

In one implementation, a system for image processing, pertaining to object detection and object classification, in which the pre-training is provided, is described herein. The image processing system comprises an image capturing means which is positioned to face the area to be monitored, a processor which is communicatively coupled to the image capturing means, and a Deep Neural Network Architecture (DNN) engine. The processor executes the DNN engine in two stages. The first stage is to process the one or more images which are captured by the image capturing means to detect an object associated to a wildlife and then to classify the detected object with the help of custom built convolutional neural network (CNN) model. This custom CNN model for classifying the detected object on the second stage takes help of three sets of 2D Convolutional layers with 32 kernels and a Max Pooling layer, followed by one fully connected Dense layer. Also, the custom CNN model is pre-trained to classify the object detected into a specific category of the wildlife.

In another implementation, a method for image processing, pertaining to object detection and object classification, in which the pre-training is also provided, is described herein. The method may comprise one or more steps for image processing. For the purpose of image processing, an image capturing means may capture one or more image(s) within the area to be monitored and a processor may execute a Deep Neural Network Architecture (DNN) engine in two stages. The two stages consist of first processing the one or more images captured via the image capturing means and then classifying the object detected using a custom convolutional neural network (CNN) model with three sets of 2D Convolutional layers with 32 kernels and a Max Pooling layer, followed by one fully connected Dense layer. This CNN may be pre-trained to classify the detected object into a specific category of the wildlife.

In another implementation, a non-transitory computer readable medium storing program, pertaining to image processing, in which the program comprises programmed instructions, is described. The set of programmed instructions may comprise the steps of capturing one or more images within the area to be monitored for an image and then the step of executing a Deep Neural Network Architecture (DNN) engine in two stages. The two stages consist of first processing the one or more images captured via the image capturing means and then classifying the object detected using a custom convolutional neural network (CNN) model with three sets of 2D Convolutional layers with 32 kernels and a Max Pooling layer, followed by one fully connected Dense layer, This CNN may be pre-trained to classify the detected object into a specific category of the wildlife.

BRIEF DESCRIPTION OF DRAWINGS

The detailed description is described with reference to the accompanying Figures.

DETAILED DESCRIPTION

Reference throughout the specification to "various embodiments," "some embodiments," "one embodiment," or "an embodiment" means that a particular feature, structure, or characteristic described in connection with the embodiment is included in at least one embodiment. Thus, appearances of the phrases "in various embodiments," "in some embodiments," "in one embodiment," or "in an embodiment" in places throughout the specification are not necessarily all referring to the same embodiment. Furthermore, the particular features, structures or characteristics may be combined in any suitable manner in one or more embodiments.

Figure 1:
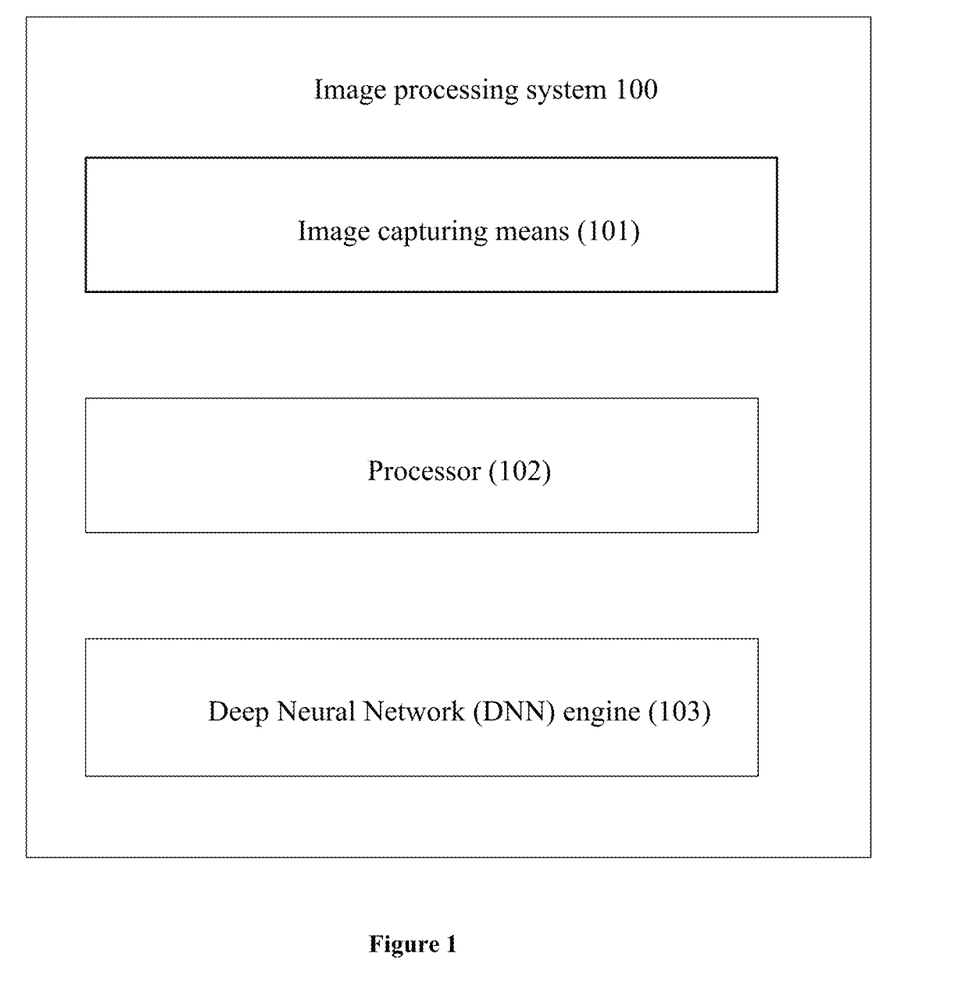
FIG. 1 illustrates an image processing system 100 for object detection and classification, in accordance with an embodiment of the present disclosure.

Referring to FIG. 1, implementation of an image processing system 100 for object detection and classification is illustrated, in accordance with an embodiment of the present subject matter. In one embodiment, the system 100 may comprise an image capturing means 101, a processor 102, and a Deep Neural network 103. The processor 102 further, is communicatively coupled to the image capturing means 101. The processor 102 executes a Deep Neural Network Architecture Engine (DNN) 103.

Figure 2:
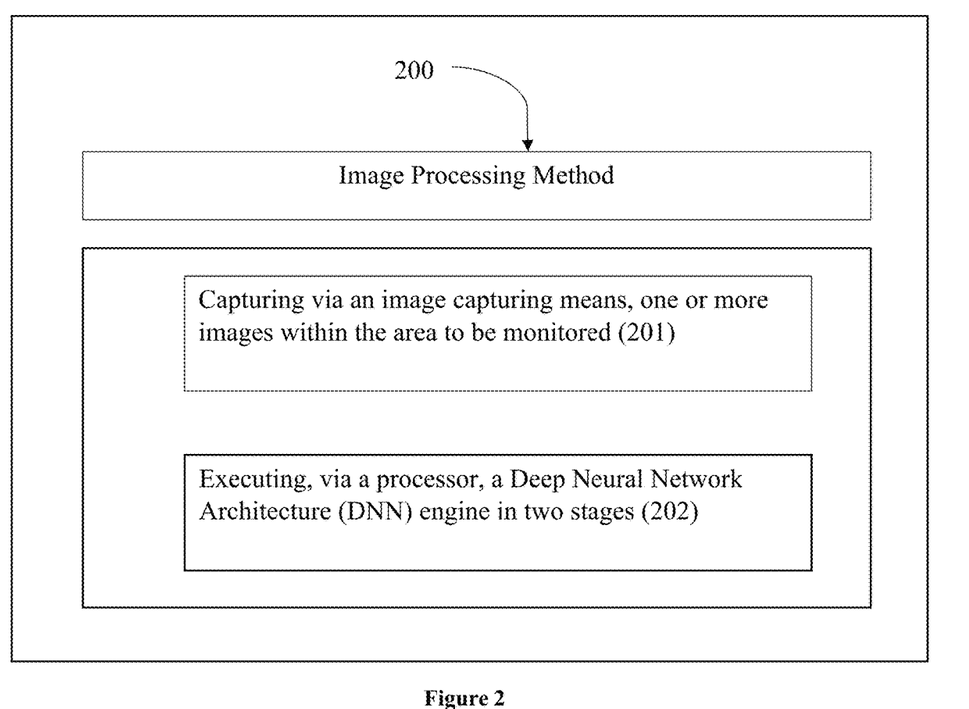
FIG. 2 illustrates a method of image processing 200 for object detection and object classification, in accordance with an embodiment of the present disclosure.

Referring to FIG. 2, implementation of an image processing method 200 for object detection and classification is illustrated, in accordance with an embodiment of the present subject matter. In one of the embodiments, the image processing method 200 captures one or more images with the help of image capturing means, preferably a camera as indicated by step 201. The images are taken from within the area to be monitored. In one of the embodiment 140 camera locations are used to capture over 18 different species of animals including the coyote. This yielded 57,864 images, out of which 4,431 coyote images are extracted based on the annotations provided. Further, the cameras may be connected to a computer. Further, this can be an embedded processing unit that is part of the camera. Images of the monitored area can be taken by a program running on the computer. The high-resolution colour image from the camera is converted to grayscale, re-sized to 100×100 pixels, and passed on to the Deep Neural Network architecture (DNN) engine for execution at step 202. The DNN engine has two stages as shown in FIG. 3.

Figure 3:
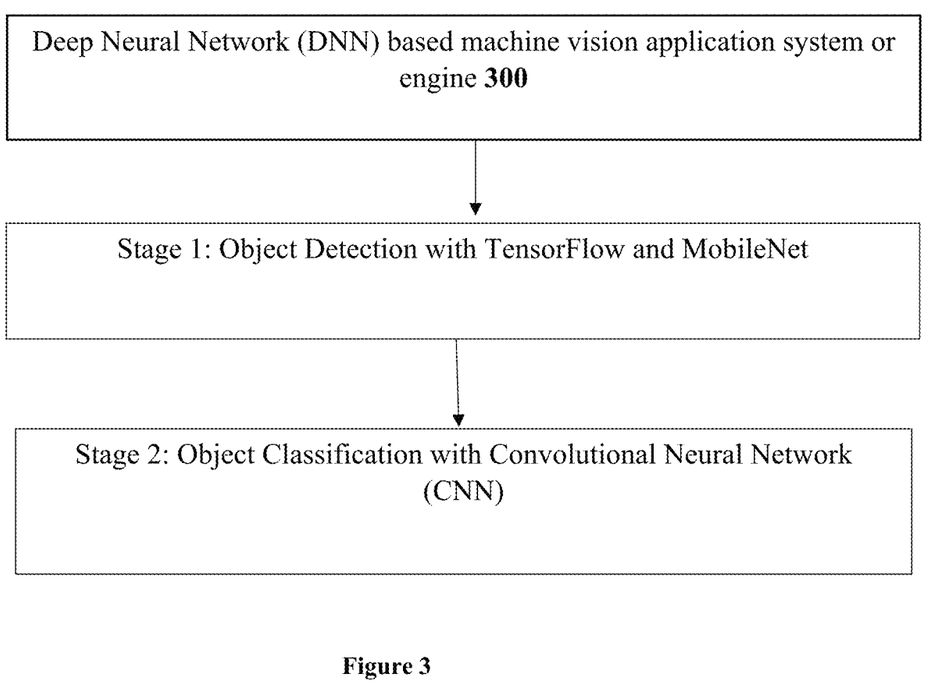
FIG. 3 illustrates the DNN based Machine Vision Application System (engine) 300, in accordance with an embodiment of the present disclosure.

Referring to FIG. 3, DNN engine 300 consists of two stages. Stage 1 is to detect object with a system which is based on MobileNet that is available on TensorFlow. MobileNet is a depth-wise separable convolutional neural network and is optimized for uses in settings where the processing power and memory availability is low. Further, TensorFlow Object Detection API is leveraged for the object detection stage. "SSD MobileNet v2 320×320" out of the box model trained on the COCO 2017 dataset is used for object detection leveraging the Single Shot MultiBox Detector (SSD) architecture for detecting the bounding boxes of objects within an image. This model is chosen due to its lower footprint (44 MB) and higher speed of execution (19 ms).

Stage 2 is to classify the detected object with a custom Convoluted Neural Network (CNN). In image classification, the input images are classified into one of many pre-specified categories. A key aspect in using image classification CNNs for a certain task is to formulate the task as a classification problem. Further, once objects in an image are detected and bounding boxes around them are marked, it is then possible to apply image classification to identify any object that is detected in an image as belonging to a specific class. The processor executes the DNN architecture engine in the above mentioned two stages through program instructions 400 as shown in FIG. 4.

Figure 4:
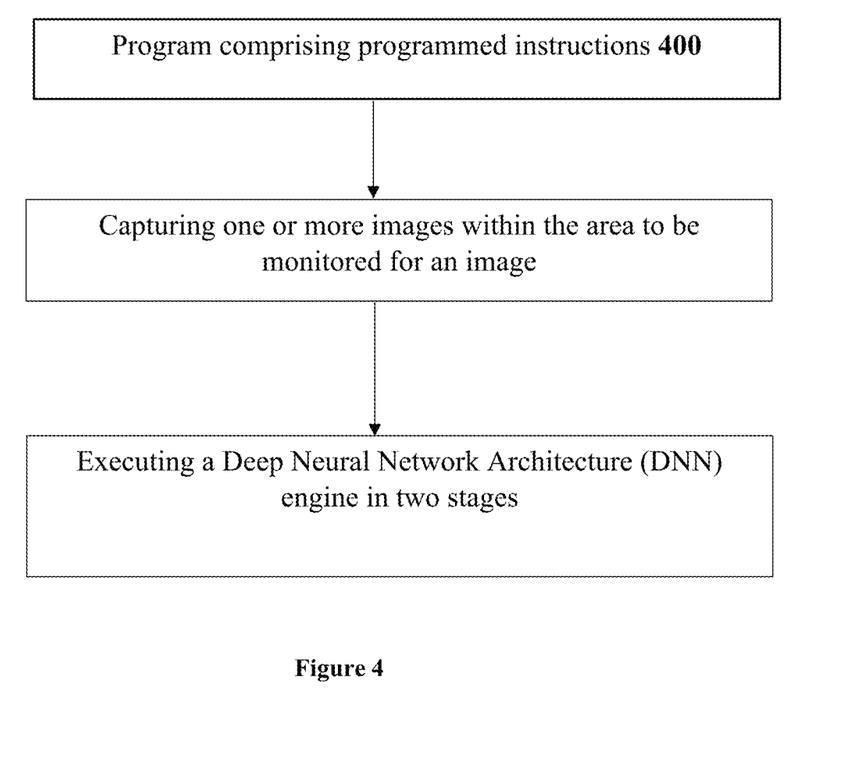
FIG. 4 illustrates programmed instructions of a program 400 for image capturing and image processing and classification executed by a Deep Neural Network (DNN) architecture engine, in accordance with an embodiment of the present disclosure.

Referring to FIG. 4, implementation 400 of program instructions is shown, in accordance with an embodiment of the present subject matter. The DNN engine classifies the images detected with the help of custom CNN. The custom CNN is further described in FIG. 5.

Figure 5:
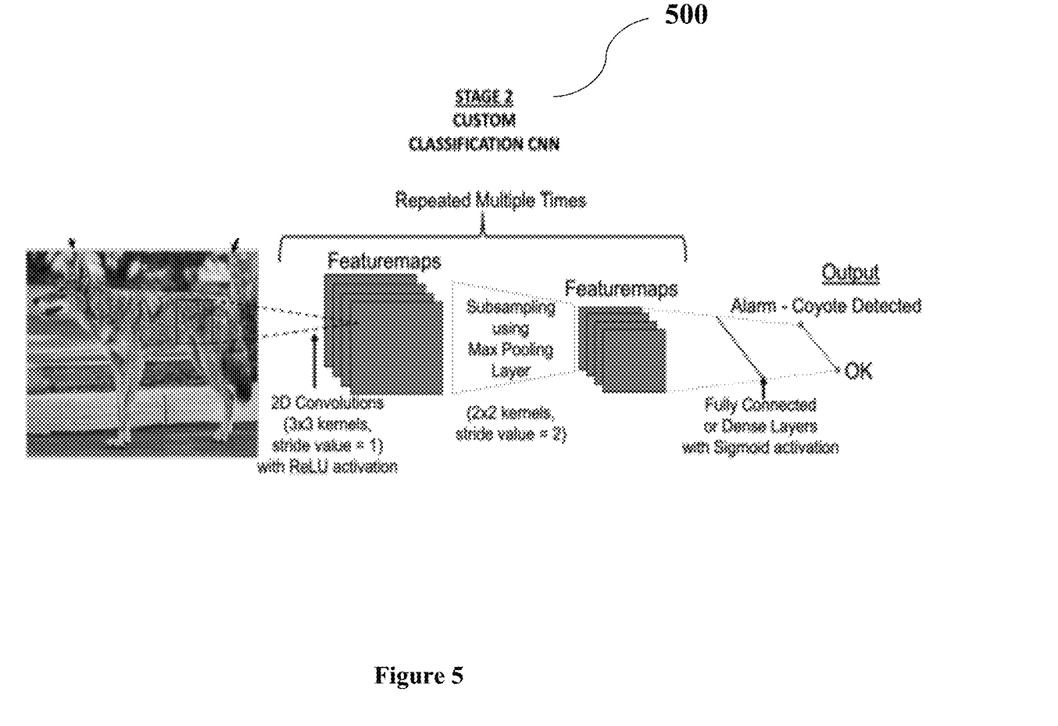
FIG. 5 illustrates the second stage of DNN run by custom CNN 500 for image classification, in accordance with an embodiment of the present disclosure.

Referring to FIG. 5, the architecture of custom CNN 500 is illustrated, in accordance with an embodiment of the present subject matter. Once an object in an image is detected and bounding boxes around them are marked, it is then possible to apply image classification to identify any object that is detected in an image as belonging to a specific class. The CNN 500 consists of Convolutional Layers and Pooling Layers in certain combinations. The custom CNN 500 is built on the combination that yield the best result, in terms of higher accuracy combined with the lower error/loss. The core of the custom CNN model 500 in the second stage is built with the use of TensorFlow/Keras. Further, the combination of a Convolutional Layer with a Max Pooling Layer is used as a single convolutional processing unit. Different models are built and trained with variations in the combinations of Number of (Convolutional layer+Max Pooling layer) convolutional processing units, Number of kernels within each Convolutional layer, and Number of Dense layers. In a preferred embodiment, the best combination is found to have three sets of 2D Convolutional layer with 32 kernels and a Max Pooling layer, followed by one fully connected Dense layer.

Further, sequential modeling (where layers are organized sequentially) is used to develop the various layers in the neural network of CNN. Further, three primary steps are used to build and implement the Custom CNN. The step 1 being the Pre-processing (which involves image manipulation) and pickling the training dataset images. Step 2 comprises Model training and step 3 is the Model deployment, experimentation, and continual improvement. Further, the models are compiled with the parameter of "Sparse Categorical Cross Entropy", which computes the cross-entropy loss between the labels and predictions, is used as the loss function. Another parameter is the optimizer that is used which is the Adam optimizer. The third parameter is Accuracy matrix capturing being enabled. In an alternative embodiment, the final dense layer has a Sigmoid activation function and a dropout rate of 0.5 (50% probability of shutting down randomly chosen nodes in each layer of the neural network). A batch size of 32 is used to maintain high computational efficiency and to lower the overall space/volume requirement for training each model. The parameters and along with three primary high-level steps, the custom CNN system is built. Each model is tested with the parameters along with different configurations for loss and accuracy evaluation. Accuracy is calculated by counting the correct predictions and dividing it by the total number of predictions. The Sparse Categorical Cross Entropy function is used to calculate the loss. The performance data is logged and visualized in Tensor-Board. The intent is to find the best performing model in terms of highest accuracy and lowest loss for this classification task. If two models yield similar accuracy/loss rates through various epochs, the size (in terms of memory used) of the yielded model is considered.

In one of the embodiments, the model 1 has a one cycle of 2D convolutional layer with 32 kernels and 1 Max Pooling layer followed by 1 Dense layer. In another embodiment, model 2 has 3 times 2D convolutional layer with 32 kernels and 1 Max Pooling layer followed by 1 Dense layer. Another embodiment has model 3 having 3 times 2D convolutional layer with 64 kernels and 1 Max Pooling layer followed by 2 Dense layers.

The custom CNN 500 is built to be easily trained and be able to incorporate retraining. Periodic retaining with live images may be performed. The system continuously captures images for predicting the presence or absence of specific wildlife species. The images predicting the specific wildlife are retained for retraining. Any image where there is an acknowledgement from the receiver is also included for the retraining. Periodic retraining of the model with the images captured as part of the system execution adapts the system to a specific area being monitored and the wildlife in that area. A training dataset is provided for the training and validation purpose. A Caltech Camera Trap (CCT) image set contains 243,187 images from 140 camera locations capturing 18 different species of animals including the coyote. Further, 20 randomly chosen camera locations are used. This yields 57,864 images, out of which 4,431 coyote images are extracted based on the annotations provided. Further, using the ImageDataGenerator package in Keras, an additional 8,306 images are generated using image transformations. The parameters for the transformations are: Flipping of images horizontally, shearing of the image up to 5%, Rotation of images with range up to 20 degrees, Zoom of images with range of 20%, Image shift (pan), horizontally/vertically by 10% of the image width/height. In the training, the original and transformed images together yield a total of 12,737 coyote images. 5% of this set of images is used as the test set. The remaining 95% is used as the training set.

Further, the finalized production model can be deployed on low powered single board computers, for example, Raspberry Pi (the model could be converted to TensorFlow Lite) or NVidia Jetson Nano (the model can be converted to TensorRT).

The Raspberry Pi implementation setup consists of hardware components as Raspberry Pi 4 Model-B with 8 GB RAM, Quad-core 64-bit Broadcom 2711, Cortex A-72 processor, and OV5647 5 MP 1080p IR-cut camera focused on the area to be monitored. While the Software setup is a 64-bit Debian GNU/Linux OS installed on Pi 4, a Camera module enabled, and Pi connected to WiFi. Python 3.7.3 for runtime, TensorFlow 2.3.0/Keras 2.4.0 to load and run model, an OpenCV 4.1.1 for image capture and manipulations, and a Boto3-1.17.30 to communicate with Amazon Web Services Simple Notification Service. The model can be fine-tuned and ported on to TensorFlow Lite. This optimizes the performance of the model, both in terms of the size footprint and execution efficiency. It ensures portability to a host of edge platforms, such as platforms with embedded Linux and microcontroller-based single-board computers based on ARM Cortex-M Series.

Figure 6:
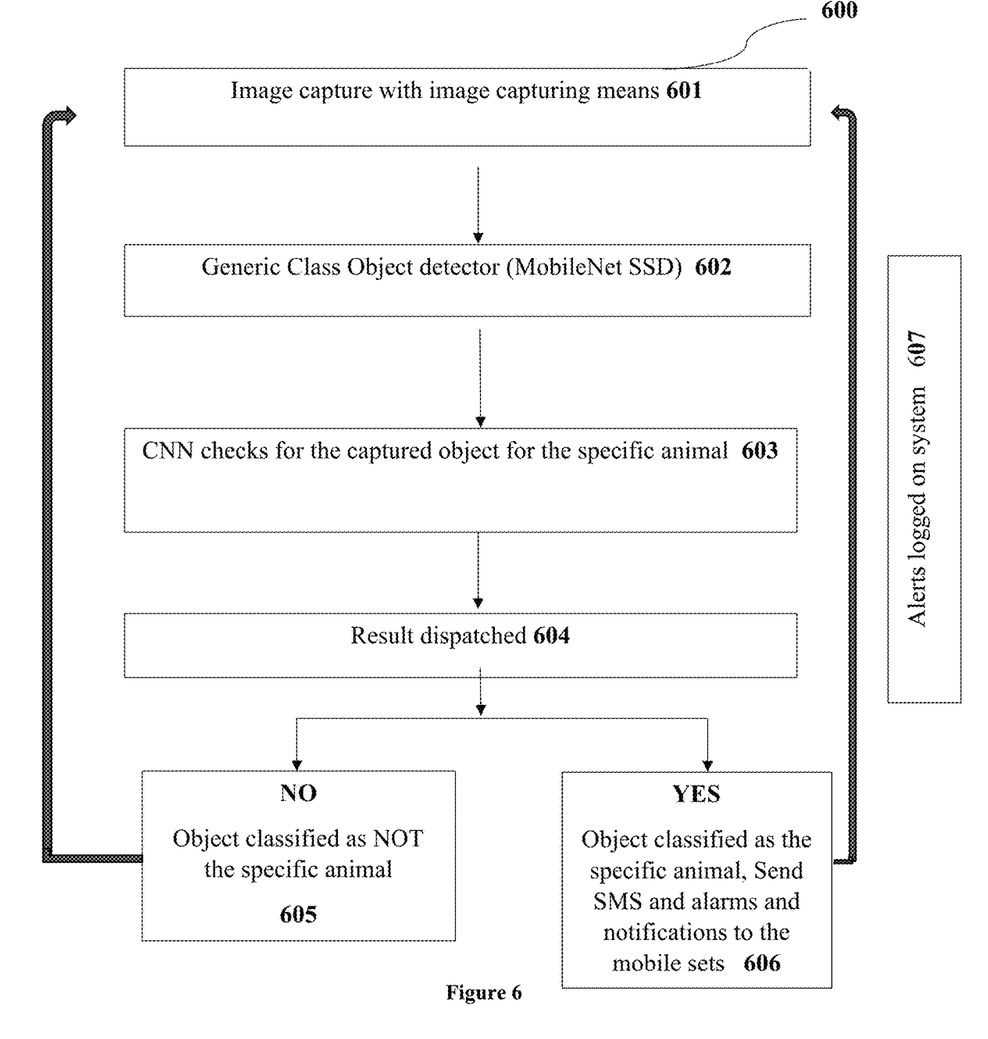
FIG. 6 illustrates an end-to-end system design 600, in accordance with an embodiment of the present disclosure.

Referring to FIG. 6, a complete end to end system design 600 is illustrated, in accordance with an embodiment of the present subject matter. At step 1 (601), an image capturing means especially a camera is positioned facing the area to be monitored. The camera is connected to a computer. This could be an embedded processing unit that is part of the camera. Images of the monitored area can be taken by a program running on the computer.

At step 2 (602), Generic Class Object detector (MobileNet SSD), pre-processing is carried on. The high resolution color image from the camera is converted to grayscale, re-sized to 100×100 pixels, and passed on to the DNN engine which consists of a custom CNN.

At step 3 (603), the custom CNN checks for the captured object for the specific animal in order to classify as relevant or not.

At step 4 (604), the results are dispatched. The model returns with confidence levels against the two categories (No animal of the specific species—OK, Animal of the specific species—Alert).

At step 5 (605), for a specific image captured, if the system decides there is no animal of the specific species being monitored, it moves to Step 1 (601) to capture the next image and proceeds to further steps.

At step 6 (606), in the case when the system detects an animal (Yes) of the monitored species, the system sends alerts and notifications to notify the neighbours, a local audible alert is generated. Further, the system can generate multiple channels of alerts such as an SMS text message. These alerts are sent to pre-configured mobile numbers of neighbours based on the camera's location. Further, at step 7 (607), the alerts get logged on to the system for further future predictions.

Further, in an alternative embodiment, a Push Notification can be sent to a mobile application along with the picture from the camera. The system can generate multiple alerts in multiple channels (for example, SMS to few phones, Push Notifications to multiple mobile devices, voice messages on home automation devices, etc). The intent is to ensure that a channel failure or latency does not hinder the performance of the system. Further, the Push Notifications can be sent along with the captured wildlife image, with options for the receiver to acknowledge and validate the notification. Two options are provided for the receiver; "Correct" to acknowledge the notification as correct and switch off alarm and "False Alarm" to indicate that the system prediction is incorrect. Further, based on the receiver's acknowledgement that the notification is correct, the corresponding images are annotated to the predicted class. If the receiver disagrees with the prediction, the opposite of what was predicted is taken as the annotation for the next round of training. As such, periodic retraining with live images can also be performed from the feedbacks of the receivers (users)/(neighbours). the system continuously captures images for predicting the presence or absence of specific wildlife species (keystone species). Any image where there is an acknowledgement from the receiver is also included for the retraining. Periodic retraining of the model with the images captured as part of the system execution adapts the system to a specific area being monitored and the wildlife in that area.

What is claimed is:

1. An image processing system, comprising;
    an image capturing means positioned to face the area to be monitored, wherein the image capturing means is configured to capture one or more images within the area to be monitored;
    a processor communicatively coupled to the image capturing means; and
    a Deep Neural Network Architecture (DNN) engine, wherein the DNN is executed by the processor in two stages to
        first process the one or more images captured via the image capturing means in order to detect an object associated to a wildlife; and then
        classify the object detected using a custom convolutional neural network (CNN) model with three sets of 2D Convolutional layer with 32 kernels and a Max Pooling layer, followed by one fully connected Dense layer, wherein the custom CNN model is pre-trained to classify the object detected into a specific category of the wildlife.

2. The image processing system as claimed in claim 1, wherein the image capturing means is a digital camera configured to perform pre-processing on the one or more images, the pre-processing comprising at least converting the one or more images into greyscale and further re-sizing the converted images to a desired size before transferring to the DNN engine.

3. The image processing system as claimed in claim 1, wherein the DNN engine detects the object associated to the wildlife based upon TensorFlow Object detection API, wherein the TensorFlow Object detection API uses Single Shot MultiBox Detector MobileNet for detecting the bounding boxes of one or more objects within the one or more images.

4. The image processing system as claimed in claim 3, wherein, the processor generates a local audible alert and/or notifies pre-configured mobile numbers of neighbours based on the digital camera's location when an animal of the monitored species is detected.

5. The image processing system as claimed in claim 4, wherein, the processor alternatively sends a Push Notification to a mobile phone device along with the picture from the digital camera, wherein the processor is capable of generating multiple alerts and sharing the alerts via multiple channels selected from a group comprising Short Messaging Service (SMS) to one or more mobile phones, Push Notifications on one or more mobile phones, and voice messages on home automation devices.

6. The image processing system as claimed in claim 5, wherein, the Push notifications can be sent along with the captured wildlife image, with options for the receiver to acknowledge and validate the notification to provide validation feedback regarding whether the alert is a valid alert or is a false positive.

7. The image processing system as claimed in claim 6, wherein based on the receiver's acknowledgement that the notification is correct, the corresponding images are annotated to the predicted class of wildlife and if the receiver disagrees with the prediction, the opposite of what was predicted is taken as the annotation for the next round of training.

8. An image processing method, comprising:
    capturing, via an image capturing means, one or more images within the area to be monitored an image; and
    executing, via a processor, a Deep Neural Network Architecture (DNN) engine in two stages for
        first processing the one or more images captured via the image capturing means in order to detect an object associated to a wildlife; and then classifying the object detected using a custom convolutional neural network (CNN) model with three sets of 2D Convolutional layer with 32 kernels and a Max Pooling layer, followed by one fully connected Dense layer, wherein the custom CNN model is pre-trained to classify the object detected into a specific category of the wildlife.

9. The image processing method as claimed in claim 8, further comprising performing, via the image capturing means, pre-processing on the one or more images, wherein the pre-processing comprises at least converting the one or more images into greyscale and further re-sizing the converted images to a desired size before transferring to the DNN engine.

10. The image processing method as claimed in claim 9, wherein the DNN engine detects the object associated to the wildlife based upon TensorFlow Object detection API, wherein the TensorFlow Object detection API uses Single Shot MultiBox Detector MobileNet for detecting the bounding boxes of one or more objects within the one or more images.

11. The image processing method as claimed in claim 10, further comprising generating, via the processor, a local audible alert and/or notifying pre-configured mobile numbers of neighbours based on the location of the image capturing means when an animal of the monitored species is detected.

12. The image processing method as claimed in claim 11, further comprising alternatively sending, via the processor, a Push Notification to a mobile phone device along with the picture from the image capturing means, wherein the processor is capable of generating multiple alerts and sharing the alerts via multiple channels selected from a group comprising Short Messaging Service (SMS) to one or more mobile phones, Push Notifications on one or more mobile phones, and voice messages on home automation devices.

13. The image processing method as claimed in claim 12, wherein, the Push notifications can be sent along with the captured wildlife image, with options for the receiver to acknowledge and validate the notification to provide validation feedback regarding whether the alert is a valid alert or is a false positive.

14. The image processing method as claimed in claim 13, wherein based on the receiver's acknowledgement that the notification is correct, the corresponding images are annotated to the predicted class of wildlife and if the receiver disagrees with the prediction, the opposite of what was predicted is taken as the annotation for the next round of training.

15. A non-transitory computer readable medium storing program for image processing, the program comprising programmed instructions for:
   capturing one or more images within the area to be monitored for an image; and
   executing a Deep Neural Network Architecture (DNN) engine in two stages for
      first processing the one or more images captured via the image capturing means in order to detect an object associated to a wildlife; and then
      classifying the object detected using a custom convolutional neural network (CNN) model with three sets of 2D Convolutional layer with 32 kernels and a Max Pooling layer, followed by one fully connected Dense layer, wherein the custom CNN model is pre-trained to classify the object detected into a specific category of the wildlife.

16. The non-transitory computer readable medium as claimed in claim 15, wherein the program further comprises programmed instructions for performing, via the image capturing means, pre-processing on the one or more images, wherein the pre-processing comprises at least converting the one or more images into greyscale and further re-sizing the converted images to a desired size before transferring to the DNN engine.

17. The non-transitory computer readable medium as claimed in claim 16, wherein the DNN engine detects the object associated to the wildlife based upon TensorFlow Object detection API, wherein the TensorFlow Object detection API uses Single Shot MultiBox Detector MobileNet for detecting the bounding boxes of one or more objects within the one or more images.

18. The non-transitory computer readable medium as claimed in claim 17, wherein the program further comprises programmed instructions for generating a local audible alert and/or notifying pre-configured mobile numbers of neighbours based on the location of the image capturing means when an animal of the monitored species is detected.

19. The non-transitory computer readable medium as claimed in claim 18, wherein the program further comprises programmed instructions for alternatively sending a Push Notification to a mobile phone device along with the picture from the image capturing means, wherein the processor is capable of generating multiple alerts and sharing the alerts via multiple channels selected from a group comprising Short Messaging Service (SMS) to one or more mobile phones, Push Notifications on one or more mobile phones, and voice messages on home automation devices.

20. The non-transitory computer readable medium as claimed in claim 19, wherein, the Push notifications can be sent along with the captured wildlife image, with options for the receiver to acknowledge and validate the notification to provide validation feedback regarding whether the alert is a valid alert or is a false positive.

21. The non-transitory computer readable medium as claimed in claim 20, wherein based on the receiver's acknowledgement that the notification is correct, the corresponding images are annotated to the predicted class of wildlife and if the receiver disagrees with the prediction, the opposite of what was predicted is taken as the annotation for the next round of training.

* * * * *